United States Patent [19]

DeCore et al.

[11] Patent Number: 4,830,698
[45] Date of Patent: May 16, 1989

[54] METHOD OF FORMING A GASKET WITH ENHANCED SEALING CHARACTERISTICS

[75] Inventors: Robert A. DeCore, Elk Grove Village; Thomas J. Justus, Arlington Heights, both of Ill.

[73] Assignee: Fel-Pro Incorporated, Skokie, Ill.

[21] Appl. No.: 183,784

[22] Filed: Apr. 20, 1988

[51] Int. Cl.⁴ .............................................. B32B 31/12
[52] U.S. Cl. .................................. 156/219; 156/278; 277/207 R; 277/235 B; 427/275
[58] Field of Search .................... 156/219, 277, 278; 277/180, 207 R, 235 B; 427/275

[56] References Cited

U.S. PATENT DOCUMENTS

| | | | |
|---|---|---|---|
| 3,061,321 | 10/1962 | Smith | 277/180 |
| 3,565,449 | 2/1971 | Ascencio et al. | 277/235 B |
| 4,140,323 | 2/1979 | Jacobs | 277/166 |
| 4,423,544 | 1/1984 | Kashmerick et al. | 277/235 A X |
| 4,535,996 | 8/1985 | Cardis et al. | 277/180 |
| 4,625,979 | 12/1986 | Inciong | 277/180 |
| 4,659,410 | 4/1987 | McDowell et al. | 156/277 |
| 4,743,421 | 5/1988 | McDowell et al. | 427/275 X |

Primary Examiner—Robert A. Dawson
Attorney, Agent, or Firm—Dressler, Goldsmith, Shore, Sutker & Milnamow, Ltd.

[57] ABSTRACT

A method of forming a gasket with an accurately aligned and deposited sealing bead and embossment arrangement. The method comprises providing a deformable gasket body having two spaced apart major surfaces. The next step involves applying a relatively incompressible sealing material against one of the major surfaces on the gasket body with sufficient pressure and in a manner deforming both of the major surfaces of the gasket body. The deformation of the gasket body defines an embossment comprising a projection extending outwardly from one major surface and a substantially corresponding indentation extending inwardly from the other major surface. Besides creating an embossment, sealing material remains in and fills the indentation to provide support for the embossment. Another step in the process involves curing the sealing material filling the indentation in the gasket body.

11 Claims, 2 Drawing Sheets

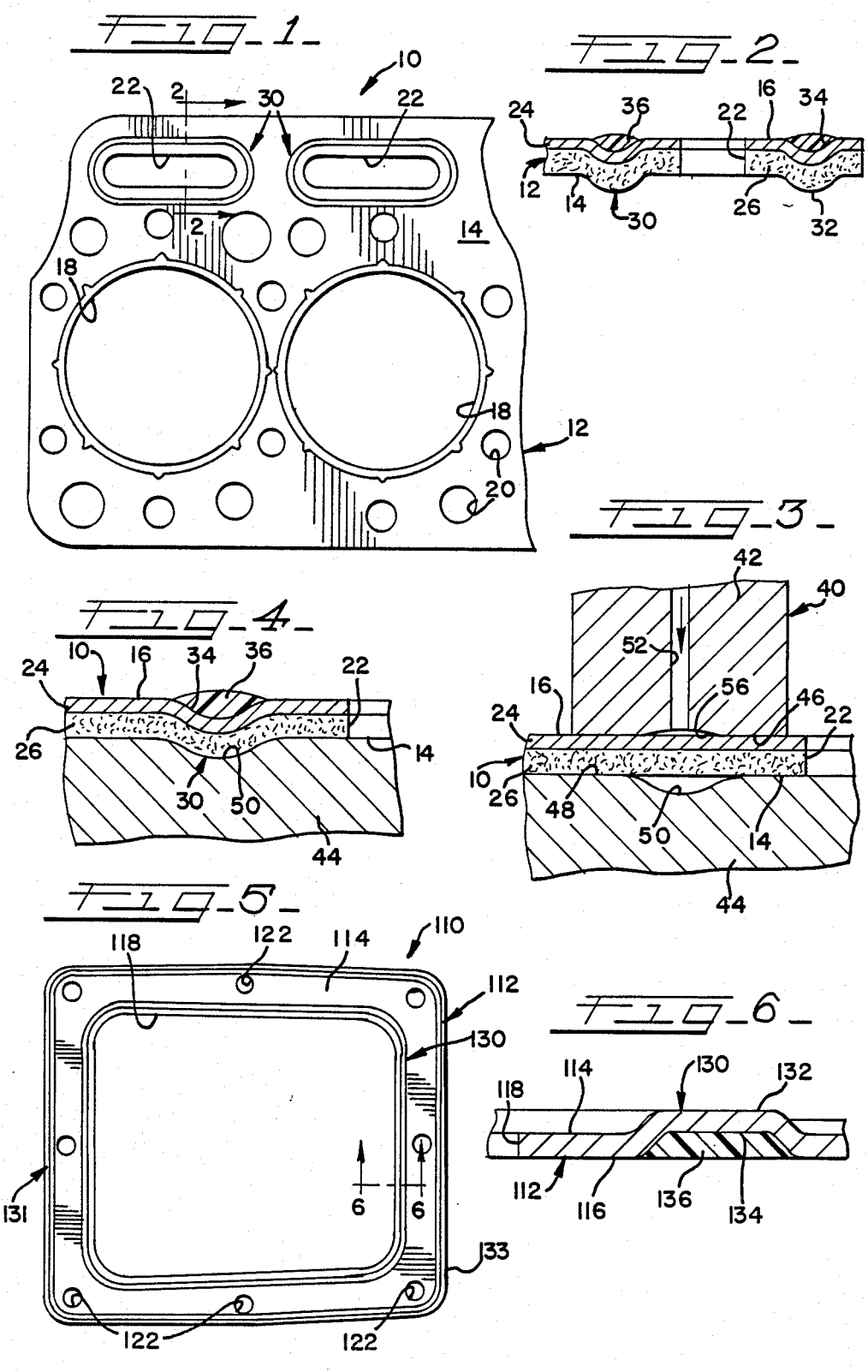

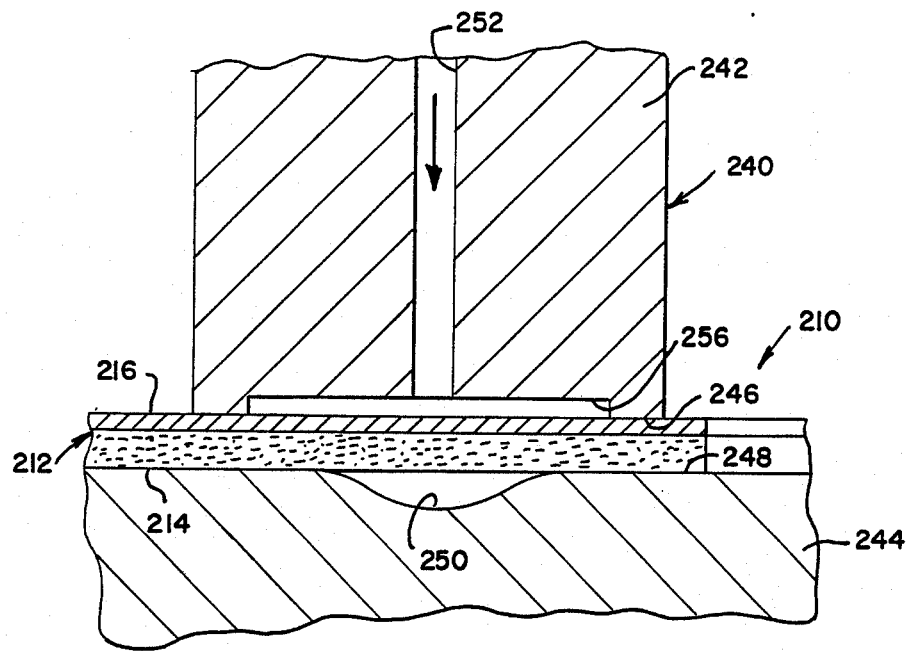
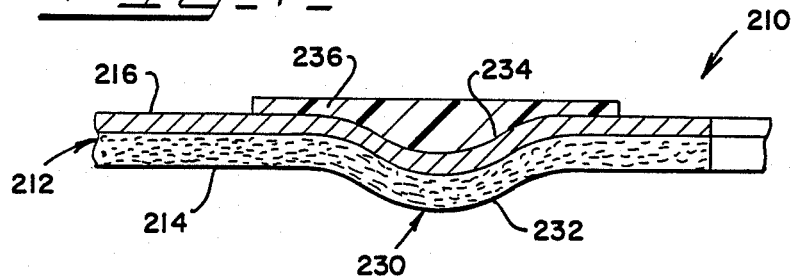

METHOD OF FORMING A GASKET WITH ENHANCED SEALING CHARACTERISTICS

TECHNICAL FIELD

This invention generally relates to a sealing gasket and, more particularly, relates to a process for forming a gasket having embossments of improved strength which resist flattening under compression thereby enhancing their sealing characteristics.

BACKGROUND OF THE INVENTION

Although mating surfaces of pairs of surfaces to be sealed, such as automotive engine head and block surfaces, appear to be smooth and flat, most frequently they are not sufficiently smooth to provide an effective seal. Accordingly, a gasket is required to be placed between said surfaces to provide an effective seal.

There are a wide variety of gasket designs which include, inter alia, metal gaskets, gaskets of fibrous materials, sandwich-type gaskets which combine a metallic core and compressible fiber-elastomer facing material laminated to the core, and so forth. As disclosed in U.S. Pat. No. 4,625,979, a wide variety of automotive gaskets are provided with sealing aids, such as elastomeric beads. Such beads are located on a face of the gasket by a number of processes. U.S. Pat. No. 4,659,410 describes a silk screening process for locating a sealing bead on a gasket face.

As disclosed in U.S. Pat. No. 4,140,323, such beads can be deposited in embossments to confine the beads when the gasket is subjected to compression. The beads provide a support for the embossment and thereby also enhance the gasket's effectiveness.

Of course, for such a bead to function most effectively, it must be accurately located within the embossments. In processes such as silk screening, therefore, it is necessary to accurately align the bead material as it is deposited in the embossment. This is both laborious and expensive. Even though great care is exercised, it is still difficult to maintain accurate alignment between the sealing bead and the embossment within which the bead is deposited.

Therefore, it would be advantageous to provide an improved method for assuring proper alignment of a deposited bead and an associated embossment.

SUMMARY OF THE INVENTION

In view of the foregoing, and in accordance with the present invention, there is provided an improved method for forming an embossed apertured gasket. The steps involved in accordance with one method involves providing a deformable gasket body defining an aperture and at least two spaced apart major surfaces. The next step in the method involves applying a relatively incompressible elastomeric sealing material against one of the major surfaces defined by the gasket body under sufficient pressure and in a manner deforming both major surfaces of the gasket body such that an embossment encircling the aperture is formed comprising a projection extending outwardly from one major surface and a substantially corresponding indentation extending inwardly from the other major surface. The indentation is filled with sealing material during the applying process to provide support for the embossment.

In a preferred form of the invention, the embossment formed is continuous and defines a complete annulus completely surrounding at least one aperture defined by the gasket body.

In accordance with one form, the gasket body comprises a metallic sheet having a fiber elastomeric sheet laminated to one side of the metallic sheet. With this embodiment, the overall gasket body can range in thickness from about 0.015 inch to about 0.045 inch.

The steps involved in accordance with another aspect of the method of making a gasket with enhanced sealing characteristrics of the present invention involves an initial step of providing a deformable gasket body defining two major surfaces. The next step involves locating the gasket body between two opposed and relatively movable die faces of a die assembly. One of the die faces has a concave annular recess provided therein. The next step involves providing a filled embossment on said gasket body by simultaneously deforming both major surfaces of the gasket body through application of a relatively incompressible sealant material under relatively high pressure against one major surface of the gasket body such that an embossment is formed comprising a projection extending outwardly from one major surface to an extent defined by the concave annular recess and a corresponding indentation extending inwardly from the other major surface. The application of the sealant material fills the indentation to provide support for the embossment.

A further step in the process of forming a gasket with enhanced sealing characteristics involves curing the sealing material in the indentation extending inwardly from the other major surface of the gasket body.

The gasket body may desirably comprise a metallic sheet which ranges in thickness of about 0.006 inch to about 0.020 inch.

Because the bead and embossment are conjointly established or created in a single operation, any concern over misalignment of the bead and the embossment is avoided. Moreover, because the bead and the embossment are established in a single operation, the improved method of forming the gasket proposed by the instant invention is a cost-effective approach to gasket-forming procedures.

Other features and advantages of the present invention will become readily apparent in the following detailed description, the appended drawings and the accompanying claims.

BRIEF DESCRIPTION OF THE DRAWINGS

FIG. 1 is a plan view of a gasket made in accordance with the principles of this invention;

FIG. 2 is a fragmentary sectional view taken along line 2—2 of FIG. 1;

FIG. 3 is a cross-sectional view of a die assembly in which the gasket of FIG. 1 may be formed;

FIG. 4 illustrates a sectional view of a gasket having a molding or forming process completed thereon;

FIG. 5 illustrates an alternative embodiment of a gasket manufactured in accordance with the principles of the present invention;

FIG. 6 is a cross-sectional view taken along line 6—6 of FIG. 5;

FIG. 7 is a fragmentary sectional view similar to FIG. 2 showing, however, another modified form of a gasket manufactured in accordance with the principles of the present invention; and FIG. 8 is a cross-sectional view of a die assembly in which the gasket illustrated in FIG. 7 may be formed.

DETAILED DESCRIPTION

While the present invention is susceptible of embodiments in various forms, there is shown in the drawings and will hereinafter be described, preferred embodiments of the invention with the understanding that the present disclosure is to be considered as an exemplification of the invention and is not intended to limit the invention to the specific embodiments illustrated.

Referring now to the drawings, wherein like reference numerals indicate like parts throughout the several views, there is shown in FIG. 1 a typical gasket 10. Gasket 10 is adapted to be disposed, in a known manner, between a pair of surfaces to be sealed, such as between a head and a block of an internal combustion engine and is adapted to be compressed therebetween. The head and block can include combustion cylinders, sleeves, pistons, oil and coolant passageways, bolt holes, etc. all of which are conventional, and in a configuration to which the basic configuration of the gasket 10 has been designed.

The details of the engine per se, which can be of various forms, form no part of the present invention, except that each gasket of the present invention will be configured as dictated by the particular engine with which it is to be used, and will be proportioned to accommodate to the openings and surfaces in the head and block with which the gasket assembly is to be used. A patent showing typical combustion openings, water and oil passages, bolt holes and the like in a gasket assembly is U.S. Pat. No. 3,565,449.

Referring now to FIGS. 1 and 2, the gasket 10 comprises a gasket body 12 defining two spaced apart major or main surfaces 14 and 16. The gasket body 12 further defines a plurality of suitably positioned apertures which may include a service opening, fluid passage openings, and openings for bolt holes, and the like. In the gasket assembly 10, which is intended for use as a cylinder head gasket, the gasket body 12 includes one or more service openings 18, smaller apertures 20 for bolt holes, and one or more openings 22 for allowing engine coolant or oil to pass through the gasket body.

Typically, the gasket body 12 may be a structure including two or more layers, such as two or more layers laminated in a conventional fashion to each other. In the embodiment illustrated in FIGS. 1 and 2, one layer of the gasket may be a steel sheet 24 defining one of the main surfaces 16. The other layer 26 may desirably be formed of a composite, heat-resistant, fiber-elastomer gasket facing material and may define the other main surface 14. Alternatively, the other layer may be a rubber layer, such as a rubber or rubber-like coating on one or both surfaces of sheet 24.

Layer 26 is laminated mechanically or adhesively to the steel sheet 24, as by a suitable heat-activated adhesive. Suitable heat-activatable adhesives include phenolic-nitrile rubber and polybutyral rubber which is desirably initially applied to the facing layer surface. Layer 26 may incorporate asbestos, glass fibers, cellulosic fibers, or other suitable fibrous material and may utilize rubber or rubber-like materials, such as nitrile, neoprene, or polyacrylic elastomers as binders.

Facing layer 26 generally resists degradation by oils and coolants, retains torque, minimizes extrusion, and exhibits heat resistance. The steel sheet may be of cold rolled steel and its thickness may vary with the particular application. Total gasket thicknesses of from about 0.015 inch to about 0.045 inch or more are typical. In the embodiment illustrated, the thickness of the steel sheet is from about 0.010 inch to about 0.020 inch. To enhance adherence, the surface of plate 24 to which layer 26 is joined may be phosphatized in a conventional manner, or may be otherwise surface treated to improve adhesion. Layer 26 may have a thickness of about 0.010 inch to about 0.025 inch. The overall thickness of an illustrative composite gasket is about 0.020 inch to about 0.045 inch.

A desired sealing pattern may be disposed on the main body portion of the gasket in selected zones. The sealing pattern may comprise one or more continuous embossments 30. As illustrated each embossment encircles an opening 22. Embossments are applied in those zones in which increased or augmented sealing forces or supplemental seals are required or desired in the application for which the gasket 10 is to be used. Typically, such sealing patterns are formed substantially to surround selected water and oil passages between the associated head and block of the engine. At times, because of the configuration of the head and block, and the locations of the bolt holes, or for other design reasons, less than a circular or completely encircling configuration may be desirable and used.

As is best shown in FIG. 2, each embossment 30 comprises a projecting portion or projection 32 extending outwardly from major surface 14, and a corresponding indentation, recess or cavity 34 which extends inwardly from major surface 16. Other embossments on the gasket 10 may be of similar construction. In the prior art, a filler material or sealing bead 36, which preferably comprises a resilient elastomeric material, is disposed in indentation 34.

One elastomeric material which is particularly suitable for use as a filler is a silicone elastomer, such as one sold by Dow Corning under the name SYLGARD 187. SYLGARD 187 is available as a two-component pourable system and may be generally described as being a condensation product of a linear, fluid organo polysiloxane containing terminal hydroxyl groups with an alkyl silicate ester. Usually a catalyst comprising a metal salt of a monocarboxylic acid is used to facilitate the curing of the system.

Although apertured gaskets of the type described above with one or more embossments are known in the art, as pointed out above, the techniques for making same are relatively expensive and not as precise as desirable. To form the embossments 30 on the gasket body 12 in accordance with this invention, a molding apparatus, as shown in simplified form in FIG. 3, may be used. The molding apparatus includes a die assembly 40 comprising two opposed and relatively movable dies 42 and 44 defining faces 46 and 48, respectively. In the illustrated embodiment, face 48 is provided with a concave annular recess 50 therein. As will be understood, annular recess 50 has a configuration corresponding to that desired for the embossment 30 on the gasket body 12. The other die 42 is provided with one or more sprue openings 52 suitably arranged relative to the recess 50 in face 48 of die 44.

The manner or method by which gasket 10 is formed will now be described. A fragment of the gasket 10 to which the embossment 30 is to be applied is shown in FIG. 3. This fragment shows that the gasket 10 includes a layered and deformable gasket body 12 defining an aperture 22 and two spaced apart major surfaces 14 and 16 with a fiber elastomeric material 26 disposed between the surfaces 14 and 16. The gasket body 12 is located between the opposed and relatively movable die faces 46 and 48 of the dies 42 and 44, respectively, such that the embossment will be properly located on the gasket body. The major surface of the gasket from which the embossment 30 is to project is placed against the die having the recess 50. The die assembly is then actuated to hold the gasket body rigidly in place between the dies 42 and 44.

A relatively incompressible, fluid elastomeric seal material, such as the SYLGARD 187 material discussed above, is then applied through the sprue openings under relatively high pressure against that major surface of the gasket opposite to the recess 50. The application of this high pressure elastomer seal material to one side of the gasket body has two simultaneous effects. First, the application of the sealant material under high pressure causes deformation of both of the major surfaces of the gasket body. That is, the application of a relatively high pressure, incompressible sealant material deforms a relatively small area of the flat major surfaces of the gasket such that the gasket body is bent and forced into the recess 50 in a manner defining embossment 30 which encircles the aperture or opening 22. The embossment 30 formed on the gasket body comprises a projection 32 extending outward from the major surface 14 of the gasket body to an extent defined by the recess 50 and a substantially corresponding indentation 34 extending inwardly from the other major surface 16 of the gasket body. Besides deforming the surfaces, some sealant material remains as a deposit or bead 36 which fills the indentation 34 of the gasket body to provide support for the embossment 30.

In general, the outer level of this filler material or bead should not extend past the point where, when the gasket is subject to compression, the filler will break down, extrude excessively, or otherwise tend to lose its sealing effect. A cavity 56 provided in the die 42 opposite recess 50 is suitably designed to limit the outer level of filler material or bead deposited in the indentation formed in the gasket body, and to properly shape the bead material such that when it is cured, it will be of the desired configuration.

FIGS. 5 and 6 illustrate another gasket 110 that is conjointly formed with an aligned bead and embossment in accordance with the method of the present invention. Here, gasket 110 comprises a gasket body 112 having a first upper gasket face or main surface 114 and a second lower gasket face or main surface 116. The gasket body 112 can be formed from a steel plate having a thickness of about 0.020 inches depending on the particular application. The principles of the present invention can be applied to an all steel gasket body ranging in thickness of about 0.006 inch to about 0.020 inch. The gasket body 112 defines a plurality of suitably positioned apertures. In the gasket assembly 110, which is intended for use as an intake manifold gasket, the gasket body 112 includes a service opening 118 and smaller apertures 122 for bolt holes.

Gasket body 112 defines a continuous embossment 130 which is spaced from service opening 118 in the preferred embodiment of the invention shown in FIG. 5. Gasket body 112 also defines a continuous embossment 131 which is spaced from an outer edge 133 of the gasket. The embossment 130 comprises a projecting portion or projection 132 extending outwardly from major surface 114, and a substantially corresponding indentation, recess or cavity 134 which extends upwardly from major surface 116. Embossment 131 is of similar construction.

The manner or method by which gasket 110 is formed with enhanced sealing characteristics is substantially similar to that method discussed above regarding gasket 10. That is, the initial step involves providing a deformable gasket body 112 defining two major surfaces 114 and 116. The next step involves locating the gasket body 112 between two opposed and relatively movable die faces 46 and 48 of the die assembly 40, with one die face having concave annular recess 50 provided therein. A filled embossment is provided on gasket 110 by simultaneously deforming both major surfaces 114 and 116 of the gasket body through application of a relatively incompressible sealant material, such as the SYLGARD 187 sealing material discussed above. The sealant material is applied under relatively high pressure against one major surface of the gasket body 112 such that embossments 130 and 131 are formed therein. Each embossment formed by this process comprises a projection 132 extending outwardly from surface 114 to an extent defined by the recess 50 and a substantially corresponding indentation 134 extending inwardly from the other major surface 166. The application of sealant material fills the indentation 134 to provide support for the embossment.

Another step in the process of the present invention involves curing the sealing material filling the indentation 134. In one form, the sealant material is cured by placing the gasket in an oven at an elevated temperature, such as 300 degrees F., for 15 minutes.

Because gaskets are usable in a myriad of applications, it may be desirable to form a layer of sealing material on a side of the gasket opposite a projecting embossment. FIG. 7 illustrates a fragment of another gasket 210 that is conjointly formed with an aligned bead and a projecting embossment and has a layer of sealing material provided in a preselected configuration on that side of the gasket opposite the projecting embossment. Here, gasket 210 comprises a gasket body 212 defining two spaced-apart major surfaces 214 and 216. The gasket body 212 may comprise a one-piece body or a laminated structure, depending upon the particular application, and has a range of thickness as described above.

A desired sealing pattern may be disposed on the main body portion of gasket 210 in selected zones. The sealing pattern may comprise one or more continuous embossments 230. The embossment 230 comprises a projecting portion or projection 232 extending outwardly from major surface 214, and a substantially corresponding indentation, recess or cavity 234 which extends upwardly from major surface 216. Gasket 210 differs, however, from the gaskets described above in that a layer of sealing material 236 is provided on a portion of the major surface 216 of the gasket body 212 opposite the embossment 230.

The manner or method by which gasket 210 is formed is substantially similar to that method discussed above regarding gaskets 10 and 110. That is, the initial step involves providing a deformable gasket body 212 defining two major surfaces 214 and 216. The next step involves locating the gasket body 212 between two opposed and relatively movable die faces 246 and 248 of a die assembly 240, as illustrated in FIG. 7, such that the embossment will be properly located on the gasket body. The die assembly 240 is then actuated to hold the gasket body rigidly in place therebetween.

The die assembly 240 comprises two opposed and relatively movable dies 242 and 244 defining faces 246 and 248, respectively. Preferably, die 242 is vertically movable toward and away from die 244. As will be understood, when a gasket body is placed therebetween, die 242 presses against the gasket body with sufficient pressure to prevent sealing material from extruding between die 242 and the gasket body during the forming process. Die 244 is substantially similar to die 44 of the die assembly 40 illustrated in FIG. 3. Like die 44, the face 248 of die 244 is provided with a concave annular recess 250 therein. As will be understood, annular recess 250 has a configuration corresponding to that desired for the embossment 230.

Die 242 is provided with one or more sprue openings 252. Die face 246 of die 242 is provided with a recessed cavity 256 which opens to the one or more sprue openings 252. As will be understood, cavity 256 has a configuration corresponding to that desired for the layer of sealing material which is to be deposited on face 216 of gasket body 212.

A filled embossment is provided on gasket 210 by simultaneously deforming both major surfaces 214 and 216 of the gasket body 212. As in the other embodiments, deformation of major surfaces 214 and 216 is achieved through application of a relatively incompressible sealant material, such as the SYLGARD 187 sealing material discussed above. The sealant material is applied through the sprue openings under relatively high pressure and against one major surface of the gasket body 212 such that embossment 230 is formed therein. The embossment formed by this process comprises a projection 232 extending outwardly from the surface 214 to an extent defined by the recess 250 and a substantially corresponding indentation 234 extending inwardly from the major surface 216. The application of sealing material fills the indentation 234. Simultaneously therewith, the application of sealing material fills the cavity 256 to provide a layer of sealing material 236 on the side of gasket body opposite the embossment 230.

The sealing material on the gasket body 210 is then cured. In one form, the sealing material is cured by placing the gasket in an oven at an elevated temperature, such as 300 degrees F., for about 15 minutes.

Because the embossment and sealant bead are conjointly established on the gasket body, the problems of alignment between the two is eliminated. Moreover, the process contemplated by the present invention will also reduce manufacturing costs since the number of process steps for forming such a gasket has been greatly reduced.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A method of forming an embossed apertured gasket comprising the steps of:
    providing a layered and deformable gasket body defining an aperture and two spaced apart major surfaces with a fiber-elastomeric material disposed between said surfaces; and
    applying a relatively incompressible elastomeric sealing material against one of said surfaces under sufficient pressure and in a manner deforming both of said major surfaces of said gasket body such that an embossment encircling said aperture is formed comprising a projection extending outwardly from one major surface and a substantially corresponding indentation extending inwardly from the other major surface, said indentation being filled with sealing material during the applying process to provide support for the said embossment.

2. The method of claim 1, and wherein the embossment is continuous and defines a complete annulus completely surrounding at least one aperture defined by said gasket body.

3. The method of claim 1, and wherein the gasket body comprises a metallic sheet having a fiber-elastomeric sheet laminated to one side of said metallic sheet.

4. The method of claim 1, and wherein said gasket body ranges in thickness from about 0.015 inch to about 0.045 inch.

5. A method of making a gasket with enhanced sealing characteristics comprising the steps of:
    providing a deformable gasket body defining two major surfaces;
    locating said gasket body between two opposed and relatively movable die faces of a die assembly, with one face having a concave annular recess provided therein; and
    providing a filled embossment on said gasket body by simultaneously deforming both major surfaces of said gasket body through application of a relatively incompressible sealant material under relatively high pressure against one major surface of said gasket body such that an embossment is formed comprising a projection extending outwardly from one major surface to an extent defined by said concave annular recess and a substantially corresponding indentation extending inwardly from the other major surface, with the application of said sealant material filling said indentation to provide support for the said embossment.

6. The method of claim 6, and wherein said gasket body ranges in thickness from about 0.006 inch to about 0.020 inch.

7. The method of claim 6, and wherein said gasket body comprises a metallic sheet having a fiber-elastomeric sheet laminated to one side of said metallic sheet.

8. The method of claim 5, and wherein said gasket body is metallic.

9. The method of claim 5 including the further step of curing the sealing material filling said indentation.

10. The method of claim 5, and wherein the gasket body includes a rubber-like coating on at least one major surface.

11. The method of claim 5, and wherein the gasket body comprises a metallic sheet and a rubber-like coating on at least one major surface of the sheet.

* * * * *

UNITED STATES PATENT AND TRADEMARK OFFICE
CERTIFICATE OF CORRECTION

PATENT NO. : 4,830,698

DATED : May 16, 1989

INVENTOR(S) : Robert A. DeCore and Thomas J. Justus

It is certified that error appears in the above-identified patent and that said Letters Patent is hereby corrected as shown below:

Column 6, line 24, the numeral "166" should be --116--.

Signed and Sealed this

Sixth Day of February, 1990

*Attest:*

JEFFREY M. SAMUELS

*Attesting Officer*  *Acting Commissioner of Patents and Trademarks*